(12) United States Patent
Hayes

(10) Patent No.: US 7,199,487 B2
(45) Date of Patent: Apr. 3, 2007

(54) MODULAR WIRING HARNESSES

(75) Inventor: Earl J. Hayes, South Lyon, MI (US)

(73) Assignee: FCI Americas Technology, Inc., Reno, NV (US)

( * ) Notice: Subject to any disclaimer, the term of this patent is extended or adjusted under 35 U.S.C. 154(b) by 653 days.

(21) Appl. No.: 10/394,462

(22) Filed: Mar. 21, 2003

(65) Prior Publication Data
US 2004/0183375 A1  Sep. 23, 2004

(51) Int. Cl.
B60L 1/00 (2006.01)
(52) U.S. Cl. .................................. 307/10.1; 307/9.1
(58) Field of Classification Search ................ 307/9.1, 307/10.1, 147
See application file for complete search history.

(56) References Cited

U.S. PATENT DOCUMENTS

| | | | |
|---|---|---|---|
| 4,051,383 A | * | 9/1977 | Dola ............................ 307/11 |
| 4,065,199 A | * | 12/1977 | Andre et al. ................. 439/498 |
| 4,249,304 A | | 2/1981 | Weinmann et al. ........... 29/872 |
| 4,429,939 A | | 2/1984 | Piasecki .................... 339/97 C |
| 4,749,368 A | | 6/1988 | Mouissie ..................... 439/421 |
| 4,824,164 A | | 4/1989 | Nakayama et al. .......... 296/146 |
| 4,831,278 A | | 5/1989 | Ueda et al. ................. 307/10.1 |
| 5,016,934 A | | 5/1991 | Pelz ........................... 296/214 |
| 5,195,908 A | | 3/1993 | Yamamoto et al. ......... 439/422 |
| 5,598,627 A | | 2/1997 | Saka et al. .................... 29/861 |
| 6,312,283 B1 | * | 11/2001 | Hio ............................. 439/422 |
| 6,392,148 B1 | | 5/2002 | Ueno et al. ............... 174/72 A |
| 6,630,625 B1 | * | 10/2003 | Akashi et al. ............ 174/72 A |
| 6,730,622 B2 | * | 5/2004 | Curro et al. ................ 442/336 |
| 6,901,657 B2 | * | 6/2005 | Takada ........................ 29/761 |
| 2001/0023775 A1 | * | 9/2001 | Takada ..................... 174/72 A |
| 2003/0070830 A1 | * | 4/2003 | Kondo et al. .............. 174/68.1 |

* cited by examiner

Primary Examiner—Robert L. Deberadinis
(74) Attorney, Agent, or Firm—Harrington & Smith, PC

(57) ABSTRACT

A system for making up wiring harnesses includes a base harness having a set of flexible multi-conductor cables and a set of supplementary wiring harnesses adapted to connect in a particular location of said base harness. The connection area does not have a multi-conductor replaceable connector to the base harness, so that the cost of unused connectors is not incurred. Each supplementary wiring harness connects to a reserved location. The reserved locations may be shared between mutually exclusive options.

23 Claims, 6 Drawing Sheets

MODULAR WIRING HARNESSES

TECHNICAL FIELD

The field of the invention is the manufacture of wiring harnesses, in particular in automotive and other motor vehicle applications.

BRIEF DESCRIPTION OF PRIOR DEVELOPMENTS

In the course of manufacturing apparatus that incorporates electrical and/or electronic functions, a recurring problem is connecting electric wires from one location to another. The most common solution in the past has been to make up a bundle of wires called a harness that can be assembled as a unit and then placed in the enclosure where it is to be used.

In the field of motor vehicle applications, a particular problem is that of cosmetic considerations. In washing machines, television sets, the customer does not see the interior. In automobiles, the customer is inside the vehicle, and is closer to any bumps in the upholstery or other noticeable effects of the wiring harness.

When the product that uses the harness has a number of options, the designers have to consider the effect of maintaining a large inventory in order to accommodate various possible combinations of options that may be ordered.

Some designers have made base harnesses that have one or more connectors to which a supplementary harness may be attached. Attaching a plug provides for flexibility, but each plug represents an additional cost, which can be recovered when the option attached to that plug is sold, but is a loss when the option is not sold.

The advent of flexible flat cables adds a further complication and has made a cost effective solution difficult to obtain.

SUMMARY OF THE INVENTION

The invention relates to a wiring harness system that employs a base harness plus a number of supplementary harnesses.

A feature of the invention is that the base harness has space reserved for a set of supplementary harnesses that are electrically and mechanically compatible.

Another feature of the invention is that the supplementary harnesses are attached by making contact to selected wires in the base harness at selected locations in a run of wire, not at dedicated connectors.

BEST MODE OF CARRYING OUT THE INVENTION

In the course of fitting wires in a confined space, such as the passenger compartment of an automobile, there is always a problem of making the required connections within the space that has been allotted by the designer. Conventionally, several wiring harnesses are used, typically each having a connector to the main harness and having a set of wires bundled together with a generally round cross section that projects away from whatever surface the harness rests against.

When options are offered by the vehicle manufacturer, it is often the case that the master harness is required to include a number of bulky connectors, in order to have provision for all possible combinations of optional accessories. Such connectors take up space and must be located somewhere they will be unobtrusive, yet within a reasonable range for running the wires to the location of the accessories that are being wired. In addition to problems of cost for connectors that are not used, there is the problem that unused connectors and wires add to the weight of the vehicle.

Figure 1:
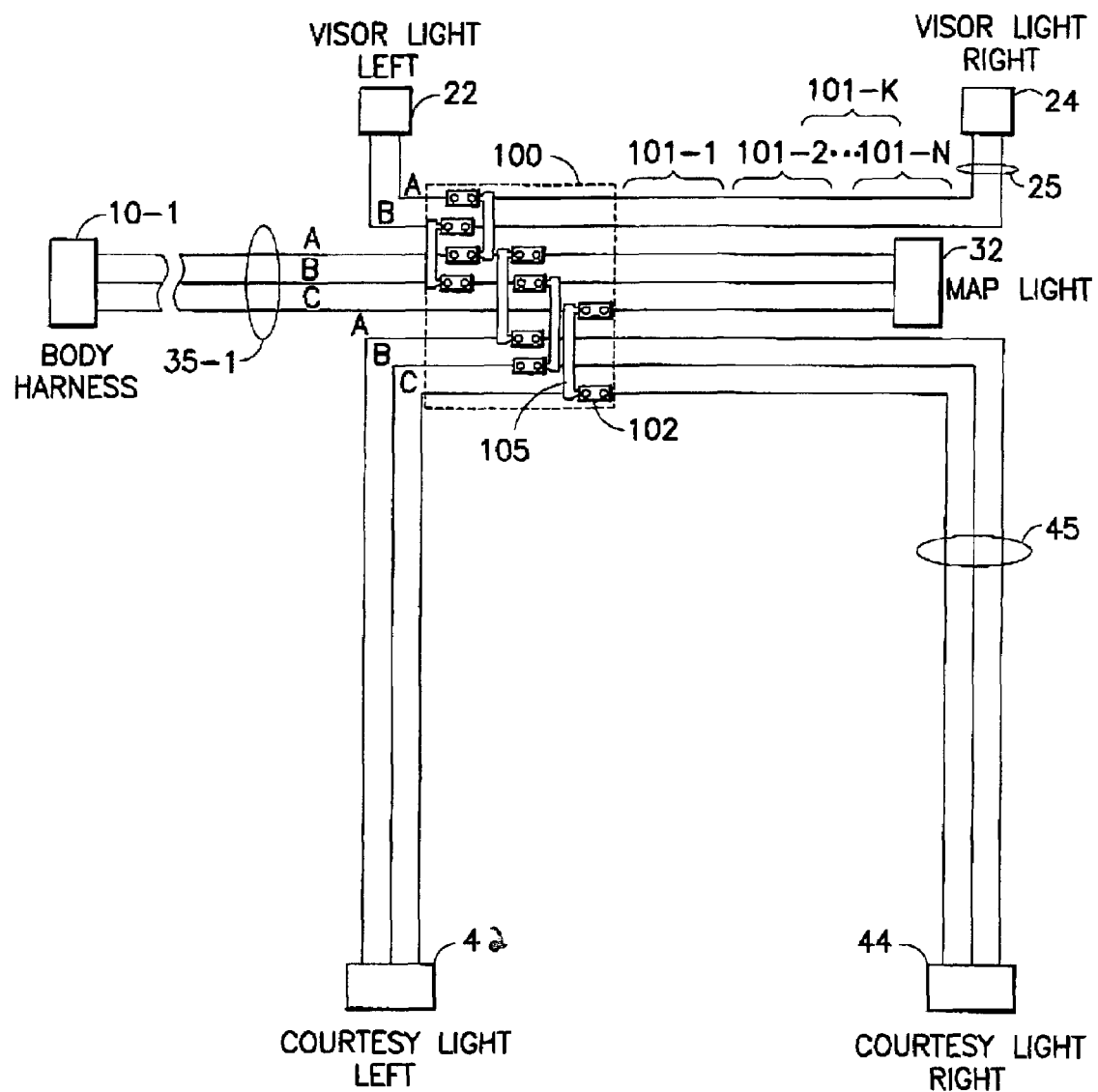
FIG. 1 illustrates in partially schematic, partially pictorial form, a base harness for use with the invention.

FIG. 1 illustrates an example of a wiring harness for a headliner (the area of the ceiling of the passenger compartment above the windshield) according to the invention. On the left of the Figure, connector 10 is the only connector between this area of the interior and the master harness (referred to as the body harness). Other harnesses that may be required will be, according to the invention, connected to selected areas of the headliner harness and not through additional connectors to the body harness. Connector 10-1 is modular—i.e. it is designed with a base connector unit and additional connector modules, shown as 10-2 in FIGS. 2 and 10-3 in FIG. 3, may be attached to it. In practice, there will be a single connector block and a number of flexible flat cables will be inserted in it from the body side and from the headliner side. This approach has the virtue of saving space, since room is not taken up by unused connectors, saving the weight of unused connectors and permitting flexibility in designing compatible modules that "piggyback" on a connector by attaching to a wire coming out of the connector, rather than putting an extra contact in the connector that may or may not be used.

In this example, connector 10-1 is connected to a three-wire flexible flat cable 35-1, referred to as the base harness, extending left to right in the Figure, ending at map light 32. At the top of the Fig., a two-wire flexible flat cable 25 connects the left and right visor lights 22 and 24. Flexible flat cable 25 is connected to flexible flat cable 35-1 through modular connection 100, comprising a set of substantially flat shunts 105, illustratively NetFlex shunts made by FCI, USA of Etters, Pa. As an example, two short metal strips 102 containing prongs, are attached to the lowest wire in cable 45 and to the lowest wire in cable 35-1. The metal strips are connected to the cables by penetration and crimping the prongs, as described with respect to FIG. 6 below. To make the connection, a flat metal strip 105 connects the two pieces 102.

Preferably, a conductor or signal passes through connector 10-1 in only one location. For example, in FIG. 1, a possible allocation of functions to wires is that flat flexible cable 35-1 has DC power on line A, ground on line B and switched power (from switches in the car doors) on line C. Corresponding lines A and B in flat flexible cables 25 and 45 are connected through module 100. Thus, the map light and the courtesy light (but not the visor lights) turn on when the car doors are opened. This arrangement permits the minimum number of connections from the body harness to the headliner.

Conductors in a flat flexible cable, which have the form of flat metal strips, will be referred to interchangeably as conductors or wires. Conductors, such as conductor A in flat flexible cables 35, 25 and 45, will be said to have duplicate functions (power, ground, switched power), etc.

Figure 6A:
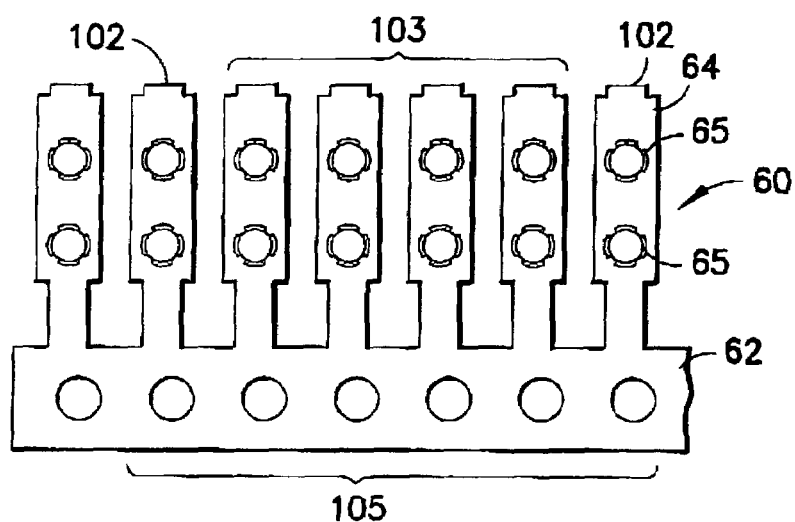
FIGS. 6A–6B illustrate a connector for use with the harnesses of the preceding figures.
Figure 6B:
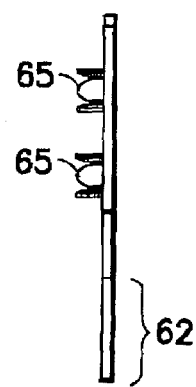

FIGS. 6A and 6B show a portion 60 of the components that form a shunt that attaches to a flexible flat cable. Metal base strip 62 supports a set of two-prong crimping members 64 that project at regular intervals to make contact to flexible flat cables. Bracket 105 indicates the extent of a sample shunt, e.g. the shunts in FIG. 1. Bracket 103 indicates strips that will be removed, leaving the two strips denoted by numeral 102 as the ones to make contact. In operation, the prongs of one strip, 64, remaining after the strips marked by bracket 103 have been removed, punch through a foil (e.g. 45 in FIG. 1) and are crimped to make electrical contact. The other strip 64 does the same with the other flexible flat cable 35-1. A side view of a strip 64 is shown in FIG. 6B, showing the attachment to strip 62 and the prongs 65, illustratively a set of four prongs that penetrate the foil of a cable being attached and are crimped to provide a secure mechanical connection. Other members of the connector family have fittings that are inserted into a connector block so that the cable can be removed and replaced (connectors that can be repeatedly removed and inserted being referred to as "replaceable connectors"). Further, other members of the connector family are adapted to connect from flexible flat cables to wires, to have solder connections, etc. U.S. Pat. No. 4,749,368, incorporated by reference, gives further information on these connectors.

This feature of the invention permits a compact connection that takes up little projecting space perpendicular to the plane of the paper and distributes power and/or signals to end points of the harness (in this case the lamps 22 and 24).

At the bottom of FIG. 1, a three-wire flexible flat cable 45 connects the left and right courtesy lights 42 and 44. The three wires in flexible flat cable 45 are also connected to flexible flat cable 35-1 by shunts 105.

Along the length of flexible flat cable 25, a set of brackets 101-1, 101-2, - - - 101-N denote locations to which additional harnesses may be connected. Bracket 101-K indicates that the spaces may overlap.

Figure 2:
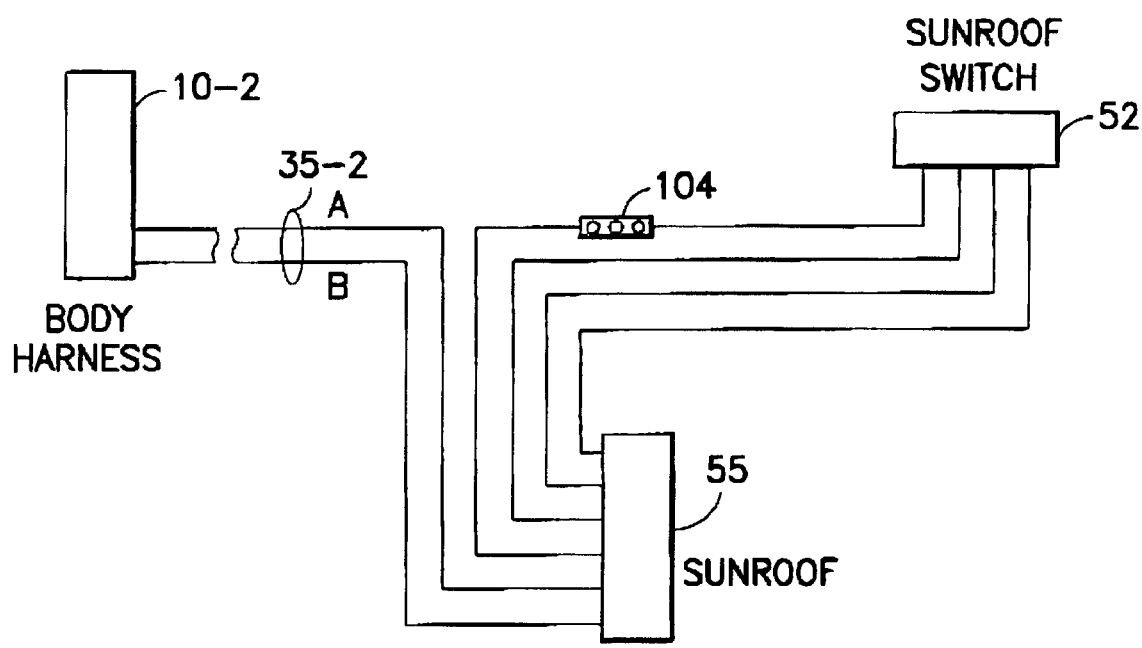
FIG. 2 illustrates a first supplementary harness.

FIG. 2 illustrates an example of a supplementary harness for an option—in this case a sunroof. On the left, connector 10-2 fits together with connector 10-1 from FIG. 1 in a composite connector to attach to the body harness. A flexible flat cable 35-2 will extend parallel to its counterpart 35-1, terminating in a sunroof switch 52 and the connector to the sunroof mechanism 55. A jumper terminal 104 is provided to connect to one of the wires in flexible flat cable 35-1. Some portions of flexible flat cable 35-2 will overlay a portion of flexible flat cable 35-1 to make the connection, providing an additional advantage of minimizing the width of the set of flexible flat cables.

Figure 3A:
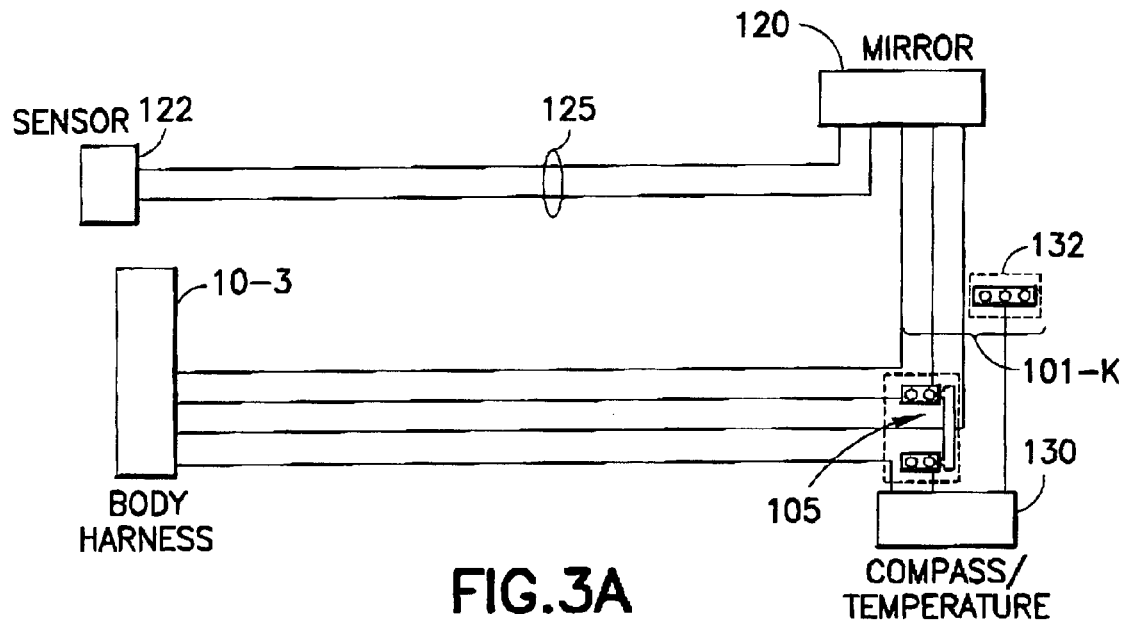
FIGS. 3A and 3B illustrate alternative versions of a third harness.
Figure 3B:
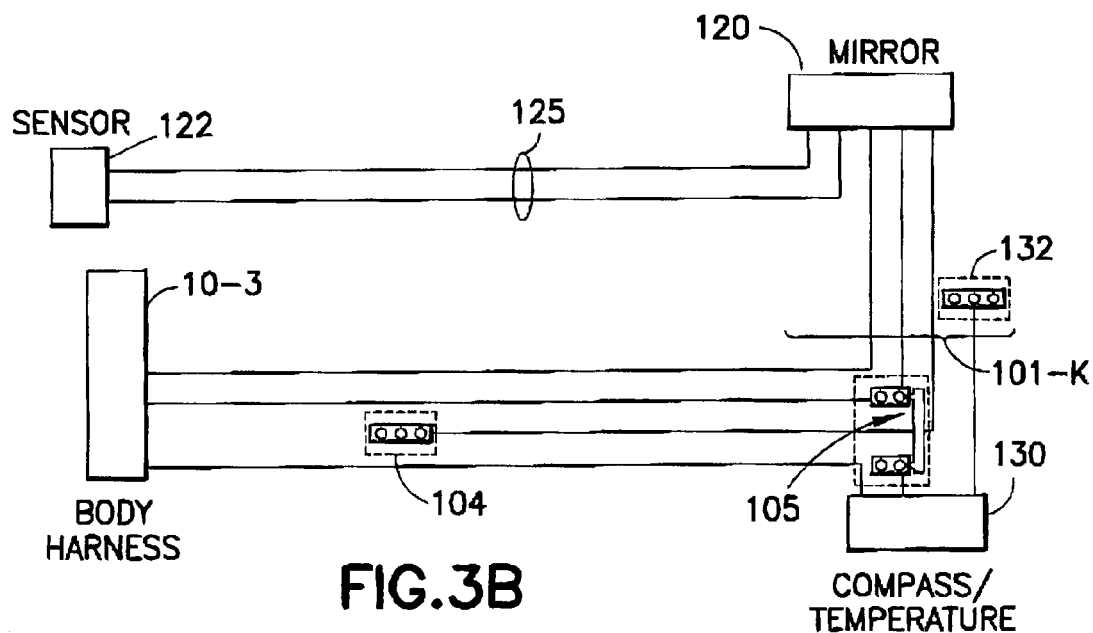

FIGS. 3A and 3B show subsets of supplementary wiring harnesses. FIG. 3B shows a member of the subset adapted to accommodate or have provision for attachment of a sunroof, with jumper 104. FIG. 3A shows a member not adapted for the attachment of a sunroof.

FIGS. 3a and 3B illustrate an advantageous feature of the invention—that the supplementary harnesses are preferably integrated, so that two versions of this ?mini-console harness are provided for vehicles with and without a sunroof. In each case, connector 10-3 fits with connector 10-1, as does connector 10-2, to form a composite connector. In each case also, the harness accommodates a light sensor 122 for the rear view mirror 120 and a compass/temperature module 130. A jumper 132 connects to a wire in the harness of FIG. 1 that runs vertically in the figure, illustrating the flexibility of the connectors, which can make contact between parallel and perpendicular foil strips with the same connector. A jumper 104 in the sunroof harness of FIG. 3B does not have a counterpart in FIG. 3A.

Figure 4:
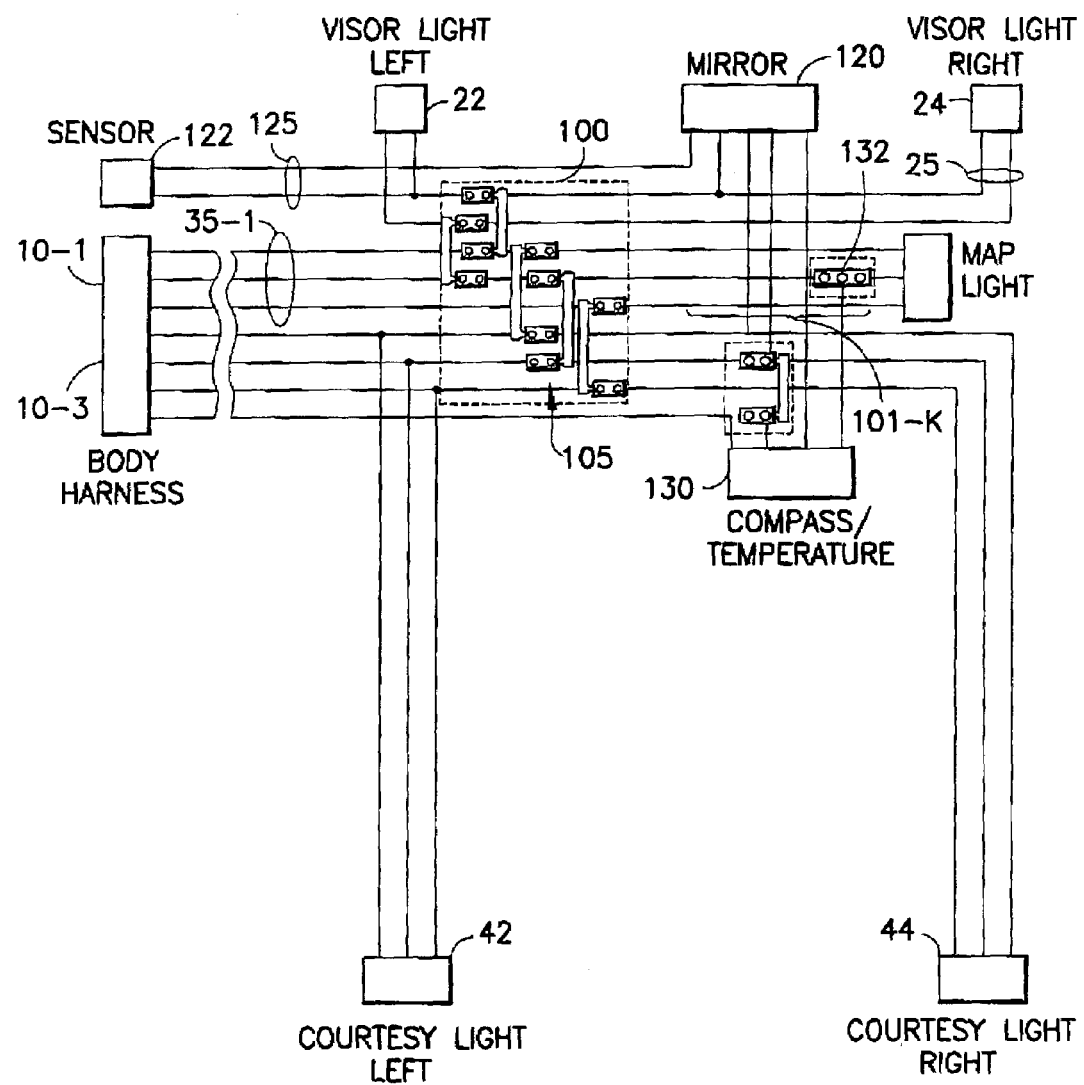
FIGS. 4 and 5 illustrate an overall view of a harness with different options.

Referring now to FIG. 4, there is shown the combination of the headliner harness of FIG. 1 with the mini-console of FIG. 3A in a non-sunroof vehicle.

Bracket 101-K, at the right side of the figure, indicates the area where the harness of FIG. 3a fits together with the headliner harness. The connection of jumper 132 with the center line of flexible flat cable 35-1 demonstrates the compact layout permitted by the present invention.

Figure 5:
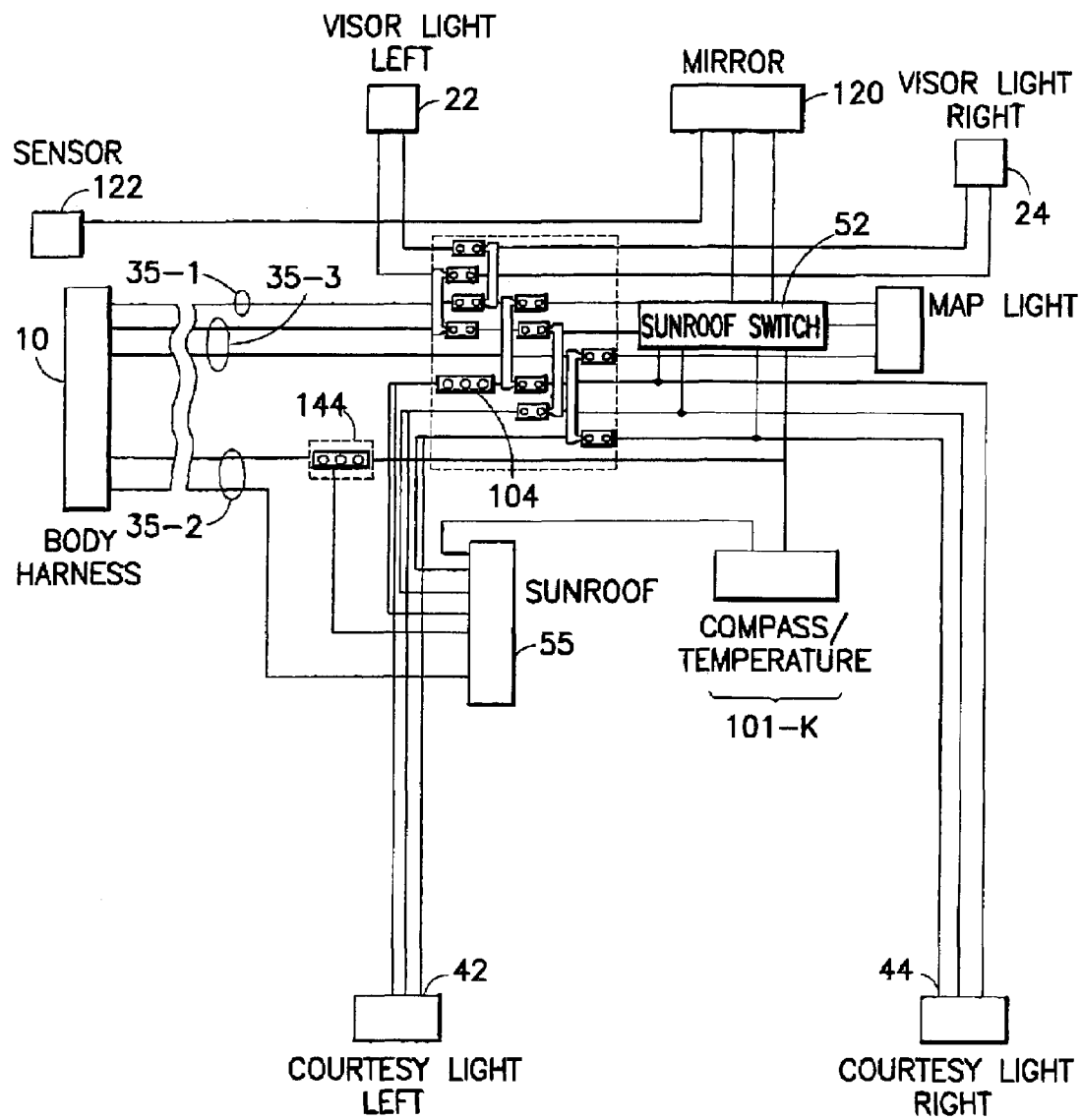

Referring now to FIG. 5, there is shown the combination of the headliner harness, the mini-console and the sunroof. Bracket 101-*k* shows the area where the mini console attaches to the headliner harness. It is evident that the sunroof harness connection overlaps the mini console connection, with the sunroof switch being at the same left-right position as the compass/temperature unit and jumper 104 of the sunroof being to the left of some of the shunts 105 in area 100. Jumper 104, shown in FIG. 2, and jumper 104, shown in FIG. 3B, are the same jumper 104 in FIG. 5. An additional jumper 144 connects line A of 35-2 of FIG. 2 to one of the lines to the Mini-Console.

Those skilled in the art will appreciate that harnesses constructed according to the invention may have more than one layer of wiring at the same location of the surface that supports the harness; i.e. that the lines in the figure that overlap may represent two or more flexible flat cables that are superimposed.

Another advantageous feature of the invention is that the jumpers and shunts are attached by machine, resulting in lower cost and greater reliability than a connection made by hand.

What is claimed is:

1. A wiring harness in a motor vehicle comprising a set of at least one flexible flat cables and having a set of attachment areas on a length of at least one of said flat flexible cables in a bass harness for attachment of at least one supplementary wiring harness, wherein the bass harness comprises a plurality of flat metal conductors, each supplementary wiring harness being associated with one of said attachment area, in which said at least one supplementary wiring harness is connected electrically to said base harness through a modular connection, wherein the modular connection comprises a base strip comprising a plurality of selectably removable flat crimping connectors, wherein the plurality of removable flat crimping connectors project at intervals corresponding to a least one of the plurality of flat metal conductors, wherein the removable flat crimping connectors comprise teeth, wherein at least one of the removable flat crimping connectors is adapted to pierce through at least one of the flat metal conductors of the base harness to make electrical contact, and wherein at least one of the remaining removable flat crimping connectors is adapted to be selectably removed from the base strip where electrical contact with the corresponding flat metal conductor is not desired.

2. A wiring harness according to claim 1, in which said at least one supplementary wiring harness is connected only by at least one flat crimping connector to said base harness.

3. A wiring harness according to claim 1, in which at least one of said set of supplementary wiring harnesses makes electrical contact between all conductors therein that duplicate a function of a conductor in said base harness.

4. A wiring harness according to claim 2, in which at least one of said set of supplementary wiring harnesses makes electrical contact between all conductors therein that duplicate a function of a conductor in said base harness.

5. A wiring harness according to claim 4, in which all of said set of supplementary wiring harnesses make electrical contact between all conductors therein that duplicate a function of a conductor in said base harness.

6. A wiring harness according to claim 1, in which at least one of said set of supplementary wiring harnesses makes electrical contact between all conductors therein that duplicate a function of a conductor in said base harness.

7. A wiring harness according to claim 6, in which all of said set of supplementary wiring harnesses make electrical contact between all conductors therein that duplicate a function of a conductor in said base harness.

8. A wiring harness according to claim 1, in which said base wiring harness comprises a first flexible flat cable and at least one other flexible flat cable having at least one conductor connected to a corresponding conductor in said first flexible flat cable.

9. A wiring harness according to claim 8, in which said at least one supplementary wiring harness is connected only by at least one flat crimping connector to said base harness.

10. A wiring harness according to claim 9, in which at least one of said set of supplementary wiring harnesses makes electrical contact between all conductors therein that duplicate a function of a conductor in said base harness.

11. A wiring harness according to claim 10, in which all of said set of supplementary wiring harnesses make electrical contact between all conductors therein that duplicate a function of a conductor in said base harness.

12. A wiring harness according to claim 1, in which a first supplementary wiring harness attached in a first attachment area is selected from a subset of at least two supplementary wiring harnesses, a first one adapted for attachment of a first option and a second one not being adapted for said first option.

13. A wiring harness according to claim 12, in which at least one of said set of supplementary wiring harnesses makes electrical contact between all conductors therein that duplicate a function of a conductor in said base harness.

14. A wiring harness according to claim 13, in which all of said set of supplementary wiring harnesses make electrical contact between all conductors therein that duplicate a function of a conductor in said base harness.

15. A wiring harness according to claim 12, in which said at least one supplementary wiring harness is connected only by at least one flat crimping connector to said base harness.

16. A wiring harness according to claim 15, in which at least one of said set of supplementary wiring harnesses makes electrical contact between all conductors therein that duplicate a function of a conductor in said base harness.

17. A wiring harness according to claim 16, in which all of said set of supplementary wiring harnesses make electrical contact between all conductors therein that duplicate a function of a conductor in said base harness.

18. A wiring harness according to claim 12, in which at least two supplementary wiring harnesses have attachment areas that overlap along said length of flat flexible cable.

19. A wiring harness according to claim 18, in which at least one of said set of supplementary wiring harnesses makes electrical contact between all conductors therein that duplicate a function of a conductor in said base harness.

20. A wiring harness according to claim 19, in which all of said set of supplementary wiring harnesses make electrical contact between all conductors therein that duplicate a function of a conductor in said base harness.

21. An electrical wiring assembly comprising:
a first electrical wiring harness comprising a first flat flexible cable comprising a plurality of first flat metal conductors;
a second electrical wiring harness comprising a second flat flexible cable comprising a plurality of second flat metal conductors;
a connection directly connecting a first one of the conductors of the first electrical wiring harness to a second one of the conductors of the second electrical wiring harness, wherein the connection comprises at least two crimping member sections connected by a flat base strip section, wherein at least one of the crimping member sections comprises a flat strip with a group of prongs, wherein the group of prongs pierce through the first flat metal conductor of the first electrical wiring harness and are crimped onto the first electrical wiring harness, and wherein the first and second conductors are laterally spaced from each other proximate the connection.

22. A motor vehicle electrical wiring assembly comprising:
a first assembly comprising:
a first electrical connector; and
a first electrical wiring harness connected to the first electrical connector, wherein the first electrical wiring harness comprises a first flat flexible cable comprising a plurality of first flat metal conductors;
a second assembly comprising:
a vehicle electrical component; and
a second electrical wiring harness connected to the vehicle electrical component, wherein the second electrical wiring harness comprises a second flat flexible cable comprising a plurality of second flat metal conductors; and
a connection directly connecting a first one of the conductors of the first electrical wiring harness to a second one of the conductors of the second electrical wiring harness, wherein the connection comprises at least two crimping member sections connected by a flat base strip section, wherein at least one of the crimping member sections comprises a flat strip with at least one group of prongs, and wherein the group of prongs pierce through the first flat metal conductor of the first electrical wiring harness and are crimped onto the first electrical wiring harness.

23. An electrical connection comprising:
a first shunt comprising a flat base strip section and at least two crimping member sections extending from the flat base strip section, wherein a first one of the crimping member sections extends at an angle from the flat base strip section, wherein at least one of the crimping member sections comprises a flat strip with at least one group of prongs adapted to pierce through a first flat metal conductor of a first electrical wiring harness and be crimped onto the first electrical wiring harness; and
a second shunt comprising a flat base strip section and at least two crimping member sections extending from the flat base strip section, wherein a first one of the crimping member sections extends at an angle from the flat base strip section, wherein at least one of the crimping member sections comprises a flat strip with at least one group of prongs adapted to pierce through a second flat metal conductor of the first electrical wiring harness and be crimped onto the first electrical wiring harness, wherein a second one of the crimping member sections of each of the first and second shunts are adapted to be connected to respective first and second conductors of a second electrical wiring harness.

* * * * *